[11] 3,602,037

| [72] | Inventor | Franklin D. Neu |
| --- | --- | --- |
| | | 2855 Shane Drive, Richmond, Calif. |
| [21] | Appl. No. | 840,267 |
| [22] | Filed | July 9, 1969 |
| [45] | Patented | Aug. 31, 1971 |

[54] APPARATUS FOR MEASURING MINUTE DEFLECTIONS
6 Claims, 5 Drawing Figs.

[52] U.S. Cl.................................................... 73/70.2,
73/293, 73/228, 350/96
[51] Int. Cl................................................ G01d 21/00
[50] Field of Search............................................ 73/71.3,
290, 293, 194 E, 327, 70.2, 228; 350/96

[56] References Cited
UNITED STATES PATENTS

| 3,273,447 | 9/1966 | Frank........................... | 350/96 |
| 3,394,976 | 7/1968 | Hawkins....................... | 73/67.2 |
| 3,435,656 | 4/1969 | Jordan et al. ................. | 73/71.3 |
| 3,448,616 | 6/1969 | Wostl et al.................... | 73/293 |

*Primary Examiner*—Richard C. Queisser
*Assistant Examiner*—Arthur E. Korkosz
*Attorney*—Kurt A. Tauchen ABSTRACT: An apparatus for measuring minute deflections comprising a straight rod of a flexible light-conducting material, such as a glass fiber having one of its ends and the adjacent end portion provided with a coat of a light-reflecting substance, such as silver, a source of light arranged to direct a collimated beam through a beam splitter into the opposite end of the rod coaxially therewith, a photomultiplier located to be impinged upon by the light beam reflected by the coated end portion of the rod and deflected by the beam splitter, and means measuring the output of the photomultiplier. When the coated end portion of the rod bends, as it does when exposed to a flowing fluid, or when in contact with a vibrating surface, absorption losses of the reflected beam increase within the coated end portion of the rod, the light received by the photomultiplier decreases and the output of the photomultiplier decreases in proportion to the degree to which the coated end of the rod is bent. The bend of the coated end of the rod in turn is proportionate to the speed of flow of the fluid or the amplitude of the vibrations to which the surface is subjected.

PATENTED AUG 31 1971　3,602,037

INVENTOR
FRANKLIN D. NEU

BY *Kurt Hauchur*

APPARATUS FOR MEASURING MINUTE DEFLECTIONS

The present invention aims to provide an apparatus for measuring minute deflections and/or displacements imparted to the end of a thin rod or stem of flexible material, that is exposed to flowing fluids or in contact with bodies that are subject to vibrations, in order to determine very accurately the speed of flow of the fluids and/or the amplitude of the vibrations. Apparatus of this type may be employed to measure the speed of the flow of blood in arteries or the vibrations to which industrial machinery is subjected during performance, and may form part of seismographic equipment.

In accordance with the invention I employ the absorption loss of a reflected light beam in a light-conducting rod having a mirror-coated end portion, to measure the degree to which the coated end portion is bent, by directing part of the reflected light beam onto a current-generating photosensitive element, such as the cathode of a photomultiplier tube. Since the mirror-coated end portion of the rod has internal reflection losses which increase as said end portion departs from a straight line, the output of the photomultiplier tube is inversely proportional to the degree of displacement or deflection of the coated end portion of the rod.

The invention will best be understood by reference to the accompanying drawing which illustrates certain preferred embodiments thereof and wherein.

Figure 1:
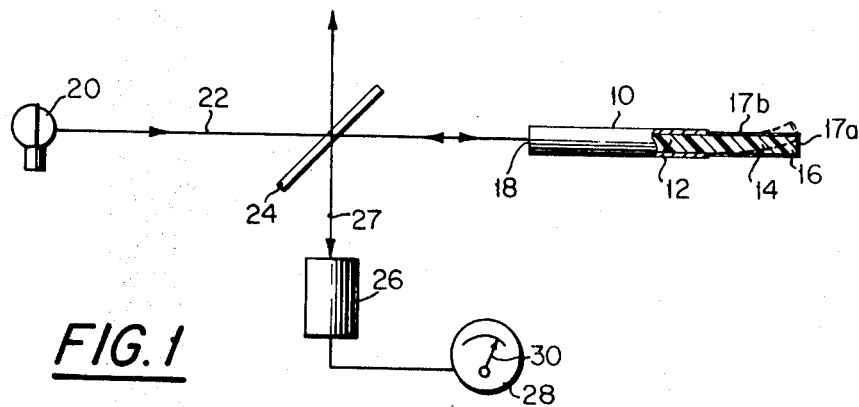
FIG. 1 is a schematic representation of a deflection-measuring apparatus embodying the invention.
Figure 2:
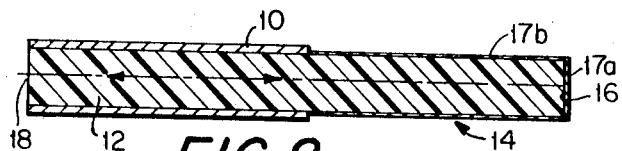
FIG. 2 is a detail view of part of the apparatus shown in FIG. 1.

Having first reference to FIG. 1 the reference numeral 10 identifies a tubular container within which is held a straight rod 12 of a transparent, i.e., light-transmitting material. This rod may be a glass fiber of a thickness of, say, 70 microns, or a thin rod or fiber of light-transmitting plastic material, such as LUCITE. The right end portion 14 of the fiber 12 projects a predetermined distance beyond the tubular holder, and its end face 16 and also its cylindrical sidewall are mirror-coated with a shiny light-reflecting metal, such as silver, as indicated at 17a and 17b, respectively, (FIG. 2). Alternatively, the sidewall of the projecting end portion 14 of the fiber may be clad with a thin layer of glass or plastic which has a higher index of refraction than the material from which the fiber 12 itself is made so that light transmitted through said end portion when said end portion departs from the linear will experience significant internal reflection losses.

Located a distance in front of the opposite end face 18 of the rod 12 along the center axis of said rod is a source of radiations, such as an electric lamp 20, which directs a collimated beam of light 22 into and through said rod coaxially therewith; and interposed between the lamp 20 and the end face 18 of rod 12 is a beam splitter 24 which is preferably so inclined relative to the common axis of beam 22 and rod 12 that only half of the beam 22 reaches the rod, while the other half is deflected in upward direction. Provided rod 12 has its original rectilinear shape, the portion of beam 22 that reaches and passes into said rod is reflected by the coated end face thereof and returns to the beam splitter 24 without significant loss, which then deflects 50 percent thereof, i.e., 25 percent of the original beam downwardly onto the cathode of a photomultiplier tube 26, as indicated at 27. The output side of said photomultiplier tube is connected to an ammeter 28, which indicates in the conventional manner by deflection of a pointer 30, the magnitude of electric current produced by said tube in response to the impingement of its cathode by the reflected and deflected portion 27 of light beam 22.

When the projecting end portion 14 of rod 12 is exposed to flow of a fluid or brought into contact with the surface of a vibrating body, it is bent in one or the other direction, such as shown in phantom lines in FIG. 1. Under these conditions the beam of light passing through the coated end portion 14, and especially its reflection from the coated end face 16 of the fiber is partially absorbed due to increased internal reflection. In consequence thereof, the intensity of the beam portion which ultimately reaches the cathode of the multiplier tube 26 decreases resulting in a drop in the output of said tube, which is indicated by a decreased deflection of the indicator needle 32 of ammeter 30. The greater the deflection or displacement of the mirror-clad end portion 14 of fiber 12, the greater are the absorption losses incurred by the beam in passing through said end portion, and the smaller is the intensity of the beam portion that reaches the cathode of the multiplier tube, and hence the magnitude of the output current of said tube. Therefore, the readings of ammeter 28 when the tip of the rod 12 is brought into contact with a vibrating body or is exposed to the flow of fluid, provide a direct measure of the degree of displacement or deflection occasioned by the end portion 14 of the rod when compared with the maximum deflection of the indicator needle 32 of ammeter 30 as produced when the rod is in its original rectilinear shape. Thus, the described apparatus is capable of registering extremely minute deflections or displacements of the rod from its original rectilinear shape, enabling precise measurement of flow rates of fluids and amplitudes of vibrations.

Figure 3:
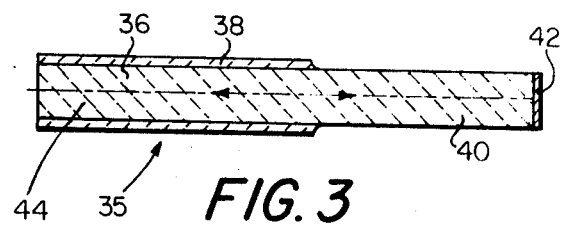
FIG. 3 is a schematic representation of part of a modified embodiment of the invention.

FIG. 3 illustrates the use, in the apparatus of my invention, of a normal light pipe fiber 35, i.e., a fiber having minimum, and in fact, almost no, internal reflection losses. Such a fiber may have a core 36 of glass that has a cladding 38 of a glass which has an index of refraction that is lower than the index of refraction of the core. In such an arrangement the light within the core is "trapped" through the principle of total internal reflection. Ordinarily such a fiber is incapable of performing in the manner and spirit of the present invention which depends upon the occurrence of reflection losses for its results, as explained above. In accordance with the invention I strip one end portion 40 of such a fiber of its cladding, which may be readily accomplished chemically, and I provide the end face of the stripped portion 40 with a light-reflecting mirror coating 42. As the tip of the described fiber is deflected, practically all of the loss in the intensity of the returned light beam occurs in the stripped end portion 40 of the fiber if the surrounding medium acts like a coating that has a higher index of refraction than the core of glass. No, or practically no reflection losses occur in the portion 44 of the fiber which is provided with the original cladding 38. This frees the measurements provided by the apparatus of the invention from any errors that may be introduced by sporadic reflection losses in the straight portion 44 of the rod, and makes it unnecessary to provide means, such as the sleeve 10 of the arrangement shown in FIG. 1, for maintaining the unclad portion of the fiber in a precisely rectilinear condition.

Figure 4:
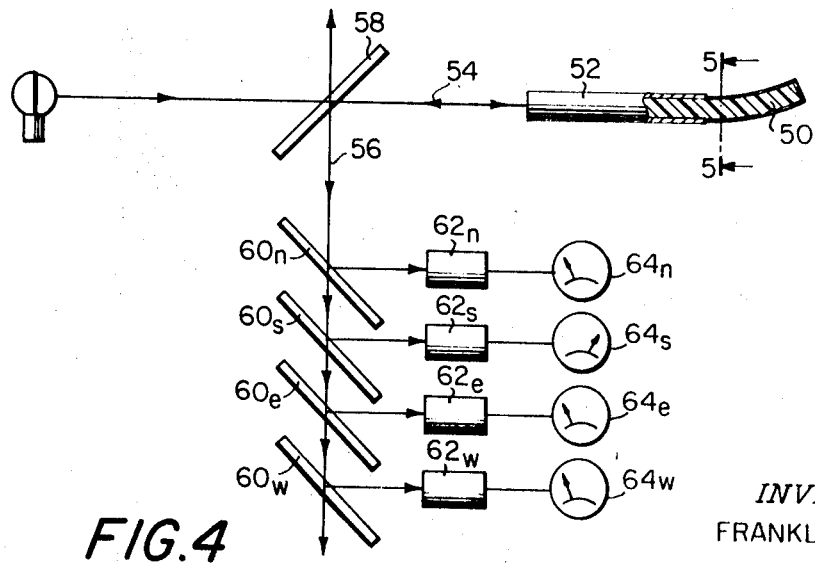
FIG. 4 is a schematic representation of yet another embodiment of the invention.

In circumstances such as when the apparatus of the invention is employed to measure the amplitude of vibrations to which a body is subjected, it may be desirable to know, not only the maximum amplitudes of the vibrations, but also the directions in which the measured amplitudes occur. FIG. 4 illustrates an apparatus which does not only provide precise measurement of minute deflections or displacements of the rod end from its original rectilinear course, but also indicates the direction in which the measured deflections occur.

Figure 5:
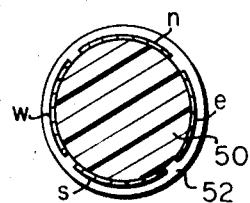
FIG. 5 is a section through a component of the apparatus shown in FIG. 4 taken along line 5—5 thereof and viewed in the direction of the arrows associated with said line.

The embodiment of the invention illustrated in FIG. 4 is similar to the embodiment illustrated in FIG. 1, but the different quadrants of the projecting end portion 50 of fiber 52 are provided with different circumferentially spaced strip-shaped diachroic mirror coatings $n$, $s$, $e$ and $w$ (FIG. 5). It is a characteristic of diachroic mirrors that they reflect only a very narrow band of wavelengths of an incident light beam, in fact, they may reflect only a single wavelength, while allowing the remaining wavelengths of the beam to pass through. Hence, when the end portion 50 of fiber 52 is bent, the reflected light beam will contain more of one of the four specific wavelengths reflected by the coatings $n$, $s$, $e$, $w$ than of the other three wavelengths, depending upon the direction in which the end portion of the fiber is bent. To analyze the reflected light beam 54 as to which of the reflected four wavelengths predeterminates—which indicates in which direction the end of fiber has been deflected—the portion 56 of the reflected light beam 54 which is deflected from coaxiality with the fiber 52 by the beam splitter 58, is passed through a sequence of four diachroic mirrors $60_N$, $60_S$, $60_e$, and $60_w$, corresponding to the four strip-shaped diachroic mirror coatings $n$, $s$, $e$, and $w$ on the free end 50 of the fiber 52. These mirrors are arranged to act as beam splitters, such that they reflect the specific wavelengths for which they are designed, onto the cathodes of photomultiplier tubes $62_n$, $62_s$, $62_e$, and $62_w$, respectively, while allowing the major portion of the deflected light beam 56 to pass through them. Comparison of the readings of the four ammeters $64_n$, $64_s$, $64_e$, $64_w$, connected to the output ends of the four photomultiplier tubes $62_n$, $62_s 62_e$, $62_w$, respectively, informs the operator not only of the degree of the deflection of the free end portion of fiber 52, but also of the direction in which the said end is being bent.

It will be understood by those skilled in the art that a suitably located prism may be used, instead of the sequence of diachroic mirrors $60_n$, $60_s$, $60_e$, and $60_w$, to split the beam portion reflected by the coated end portion of fiber 52 and deflected by the beam splitter 58 into different branch beams corresponding in wavelengths to the wavelengths reflected by the strip-shaped coatings $n$, $s$, $e$, and $w$ on the end portion 50 of fiber 52, which branch beams are then directed onto the cathodes of separate photomultiplier tubes $62_n$, $62_s$, $62_e$, and $62_w$, in the manner illustrated in FIG. 4.

Wherever I refer to "light" or "beam of light" in the specification and the claims, these terms are intended to include radiations other than those of the visible spectrum.

While I have explained my invention with the aid of certain preferred embodiments thereof, it will be understood that the invention is not limited to the specific details given by way of example, which may be departed from, without departing from the spirit and scope of the invention.

I claim:

1. Apparatus for measuring minute deflections comprising a straight flexible rod of light-transmitting material(s) having a light-reflecting coating on one of its end faces, a coating of a (reflection loss introducing) material having a higher index of refraction than said light-transmitting material provided on the end portion of said rod adjacent said coated end face thereof, means for directing a colimated beam of light through the opposite end of said rod into said rod coaxially therewith, and means for measuring variations in the light intensity of the beam reflected by the coated end face of said rod when said rod is bent.

2. Apparatus according to claim 1 wherein said rod is a glass fiber.

3. Apparatus according to claim 1 wherein the coating on the end face of said rod and the coating on the adjacent end portion of said rod is a (light-reflecting) metal with a substantial but not total light-reflecting characteristic, such as silver.

4. An apparatus according to claim 1 wherein said rod is a light-transmitting fiber composed of a core of glass and a cladding of a glass having a lower index of refraction than the glass of said core, said cladding being removed from the end portion of said fiber adjacent the coated end thereof.

5. An apparatus according to claim 1 wherein different sectors of said end portion of said rod have coatings of different materials adapted to reflect different wavelengths, and including in the path of said reflected light beam means for dividing said reflected light beam into separate beam portions according to said different wavelengths, and separate light intensity measuring means for each of the reflected beam portions.

6. An apparatus for measuring minute deflections and for indicating the direction of said deflections comprising a rod of a light-transmitting material having a light-reflecting coating on one of its end faces, coatings of different materials adapted to reflect different wavelengths on different sectors of the end portion of said rod adjacent said coated end face thereof, means for directing a beam of light into said rod through the opposite end thereof coaxially therewith, beam-splitting means interposed in the path of said light beam between said opposite end face of said rod and said light beam directing means for deflecting a portion of the light beam reflected by said coated end of said rod out of coaxiality with said rod, means in the path of said deflected light beam portion for dividing said reflected light beam portion into separate branch beams of wavelengths corresponding to the wavelengths reflected by said different coatings on the end portion of said rod, separate photomultiplier tubes with their cathodes exposed to said separate branch beams, and ammeters connected to the output sides of said photomultiplier tubes.